United States Patent [19]

Paice

[11] Patent Number: 5,148,357
[45] Date of Patent: Sep. 15, 1992

[54] AUTO-CONNECTED HEXAGON TRANSFORMER FOR A 12-PULSE CONVERTER

[75] Inventor: Derek A. Paice, Palm Harbor, Fla.

[73] Assignee: Westinghouse Electric Corp., Pittsburgh, Pa.

[21] Appl. No.: 772,504

[22] Filed: Oct. 7, 1991

[51] Int. Cl.$^5$ .................... H02M 7/00; H02M 7/06
[52] U.S. Cl. ............................ 363/5; 363/64; 363/126; 363/129
[58] Field of Search ............ 363/1, 2, 5, 45, 125, 363/126, 128, 129, 64

[56] References Cited

U.S. PATENT DOCUMENTS

| | | | |
|---|---|---|---|
| 4,255,784 | 3/1981 | Rosa | 363/125 |
| 4,366,532 | 12/1982 | Rosa | 363/69 |
| 4,482,945 | 11/1984 | Wolf et al. | 363/129 |
| 4,847,745 | 7/1989 | Shekhawat et al. | 363/132 |
| 4,876,634 | 10/1989 | Paice | 363/5 |
| 5,068,774 | 11/1991 | Rosa | 363/3 |

Primary Examiner—Steven L. Stephan
Assistant Examiner—Ben Davidson
Attorney, Agent, or Firm—M. J. Moran

[57] ABSTRACT

A 12-pulse converter of lower rating and minimal current harmonics is obtained with an auto-connected regular hexagon transformer including a delta winding in its center.

6 Claims, 8 Drawing Sheets

5,148,357

AUTO-CONNECTED HEXAGON TRANSFORMER FOR A 12-PULSE CONVERTER

FIELD OF INVENTION

The invention relates to AC-to-DC and to DC-to-AC static converters.

BACKGROUND OF THE INVENTION

It is known from U.S. Pat. No. 4,876,634 to implement a multiphase AC/DC converter system with an auto-connected transformer having two identical hexagon secondaries pertaining to separate DC branching sides formed with tappings from the apices thereof.

It is known from U.S. Pat. No. 4,876,634 to create an 18-pulse converter system with an auto-transformer having tappings distributed about an irregular hexagon wherein three windings are disposed triangularly thereon and have midtaps for the three primary lines, tappings being derived for the six secondary outputs from the apeces of the six windings. It is also shown, there, to have a regular hexagon for a 18-pulse converter, but at the expense of boosting the AC power supply to compensate for the regular succession of windings on the hexagon.

It is also known from U.S. Pat. No. 4,255,784 to establish a 12-pulse converter system with a three-phase transformer, having a delta primary and a regular hexagon for the secondary, wherein six windings are distributed regularly, each having two tappings of opposite polarities for the secondary outputs.

In all cases of multiphase converter systems operating on basic three-phase AC lines, there is a problem of harmonics on the AC lines as well as of rating for the transformer.

SUMMARY OF THE INVENTION

It is now proposed to maximize the efficiency of a 12-pulse AC/DC converter based on a regular secondary hexagon by choosing the auto-transformer approach solution, the three AC lines being directly connected at 120 degree phase shift anywhere to the hexagon and a delta winding being coupled centrally thereof with all the windings.

As a result, a 12-pulse static converter is obtained having maximum reduction of harmonics and an improved overall transformer rating.

DETAILED DESCRIPTION OF THE INVENTION

Figure 1:
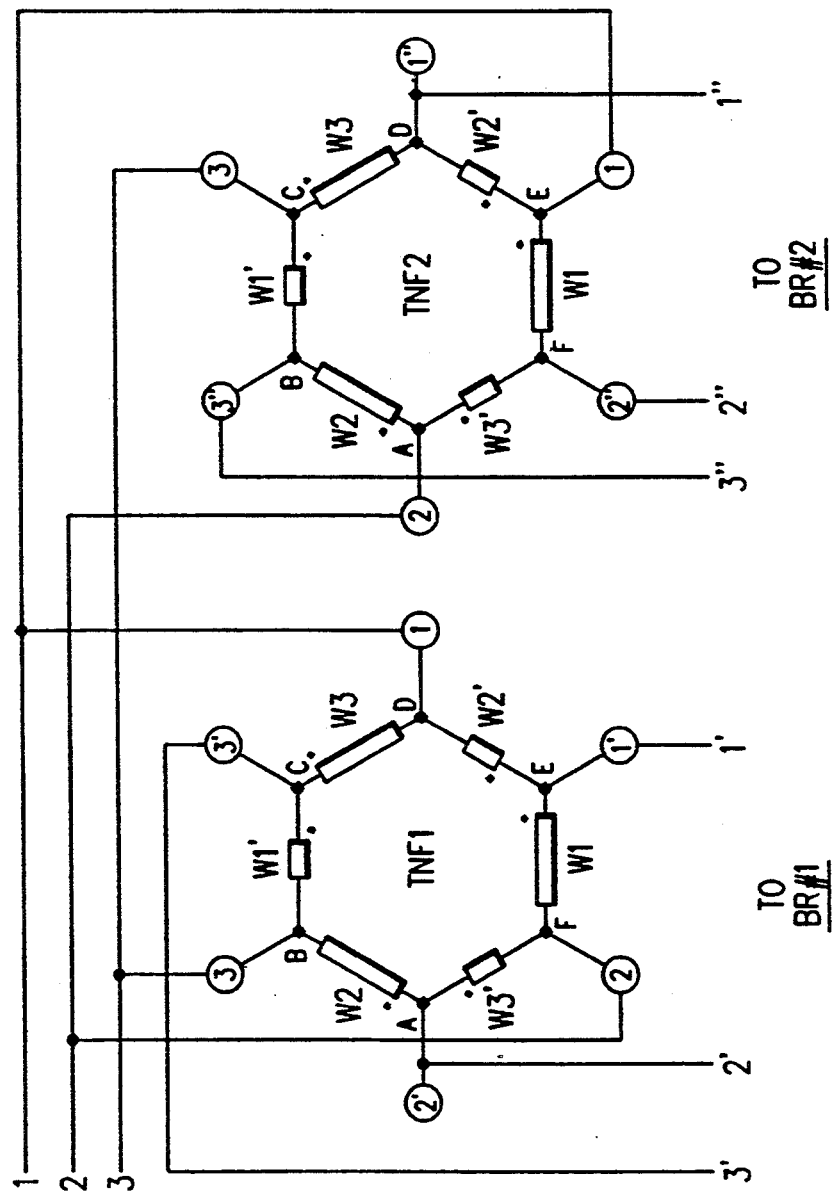
FIG. 1 shows two auto-connected hexagon transformers of the prior art concurring in forming an AC/DC or DC/AC converter.

Referring to FIG. 1 which is taken from U.S. Pat. No. 4,876,634, two hexagon-type auto-transformers TNF1 and TNF2 are associated with the three-phase AC lines (1,2,3) to generate on lines 1',2',3' for transformer TNF1 and lines 1", 2", 3" for transformer TNF2 two six-pulse rectifier systems. For the purpose of disclosing FIG. 1, the afore-stated U.S. Patent is hereby incorporated by reference.

Figure 2:
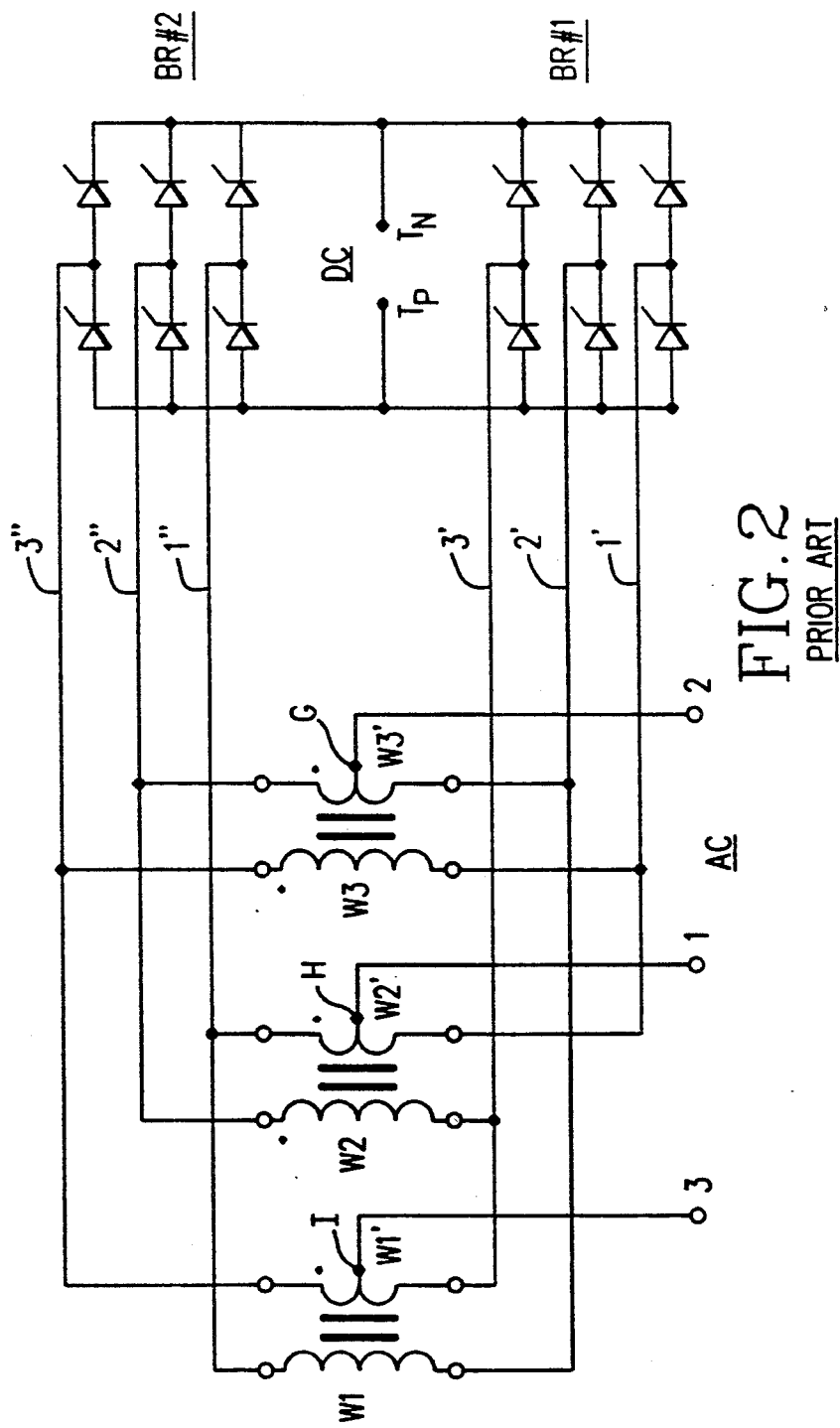
FIG. 2 shows a 12-pulse dual phase shift autotransformer as used in the prior art for AC/DC, or DC/AC conversion.
Figure 3:
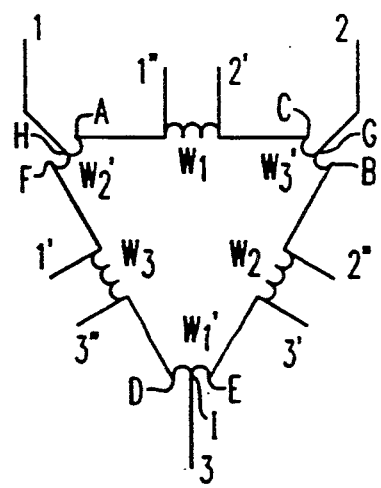
FIG. 3 is a diagram representation of the polygonal disposition of the windings of the autotransformer of FIG. 2.
Figure 6:
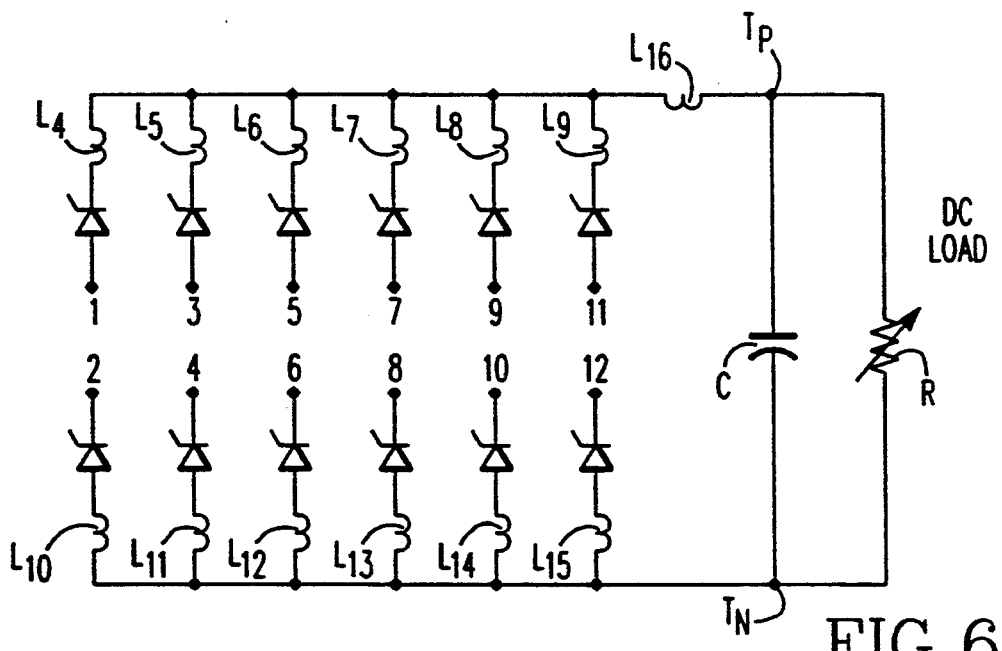
FIG. 6 shows the rectifiers used with the hexagon of FIG. 5 with a single phase inductor according to one embodiment of the invention.
Figure 7:
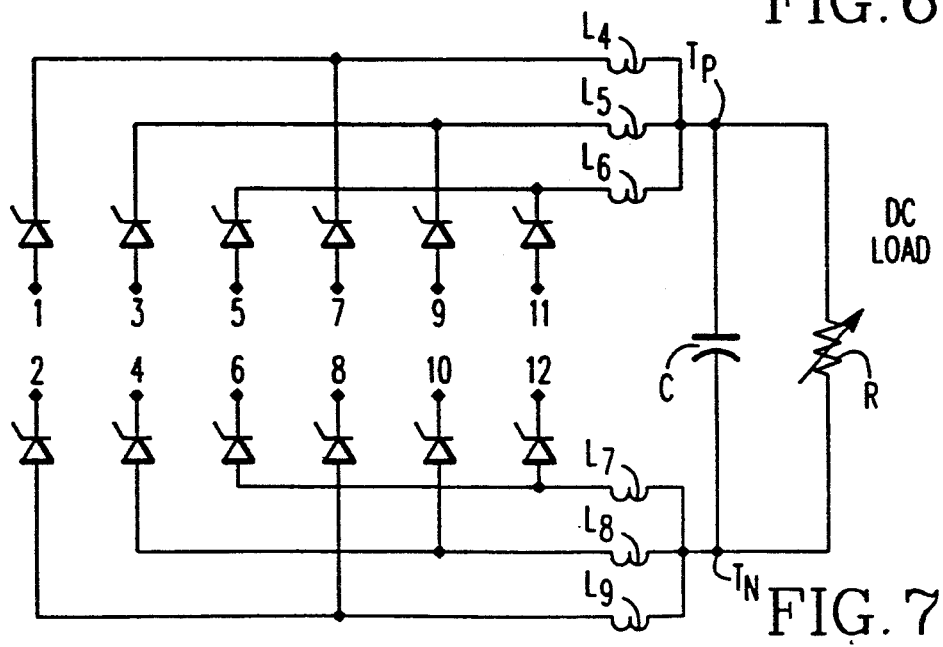
FIGS. 7 shows the rectifiers used with the hexagon of FIG. 5 and associated with three-winding inductors according to another embodiment for the invention.

FIG. 2 is also taken from the incorporated-by-reference U.S. Pat. No. 4,876,634. Instead of two transformers, a 12-pulse converter is obtained with a dual shift autotransformer. The three AC lines are going to midpoints I, H, G of three windings W'1 (between endpoints D,E), W'2 (between windings A,F) and W'3 (between windings B,C), respectively coupled to main windings W1, W2 and W3. These windings form a polygon, as shown in FIG. 3, sustaining tow pairs of three outputs (1', 2', 3') and (1", 2" and 3"). There outputs, like those of FIG. 1, are connected to two rectifier bridges BR#1 and BR#2 which as shown in FIG. 2 are mounted across the DC output terminals TN and TP opposed to the three-phase AC input lines; conversely, if the converter is a DC-to-AC converter. The equivalent conventional double-wound transformer, for a unity voltage ratio, is rated at about 15% of the total output of DC power.

FIG. 3 is also coming from the afore-stated incorporated-by-reference U.S. patent.

Figure 4:
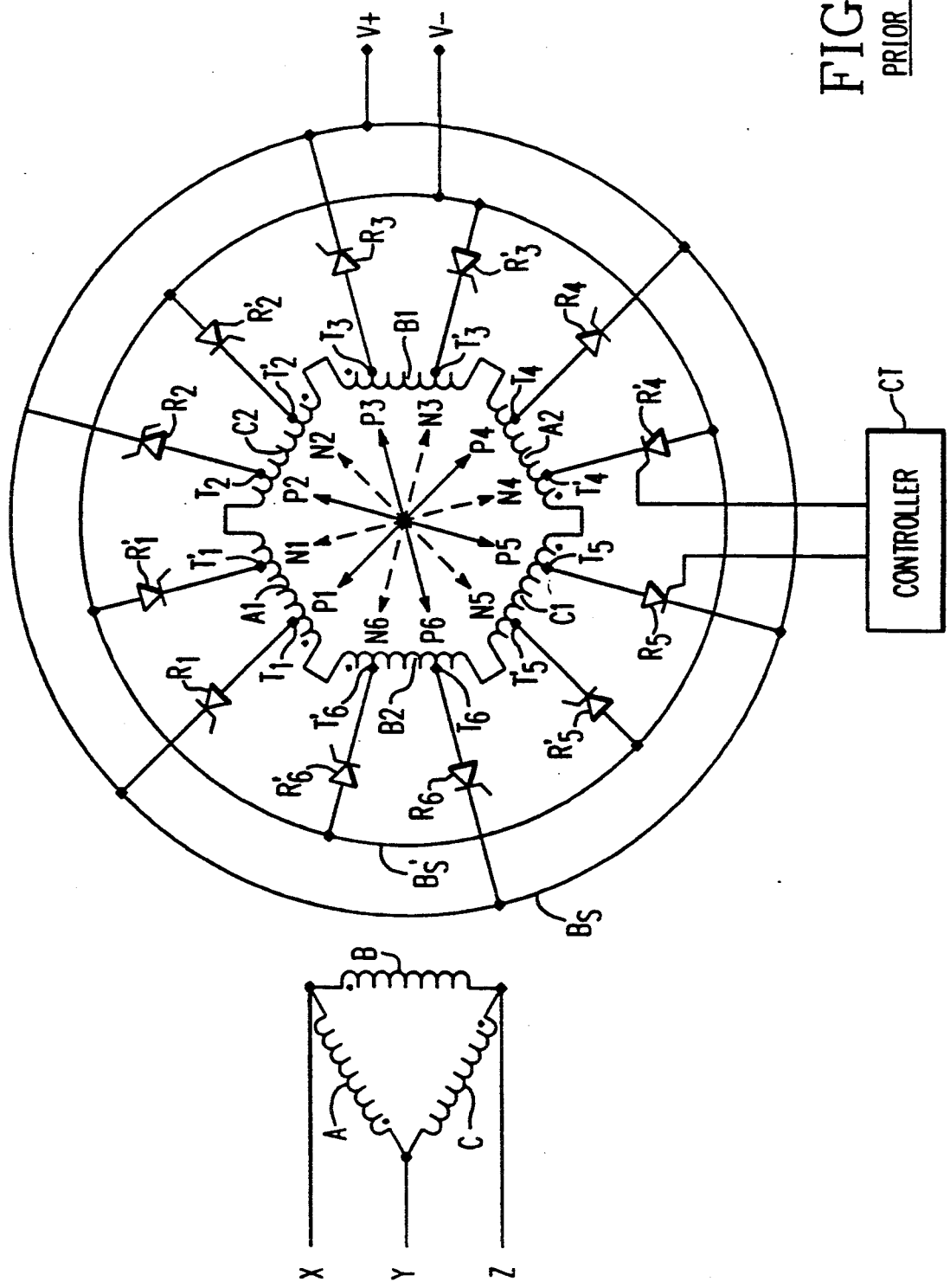
FIG. 4 shows a 12-pulse regular hexagon transformer as disclosed in U.S. Pat. No. 4,255,784 typifying a transformer-rectifier arrangement with a delta-connected primary winding.
Figure 5:
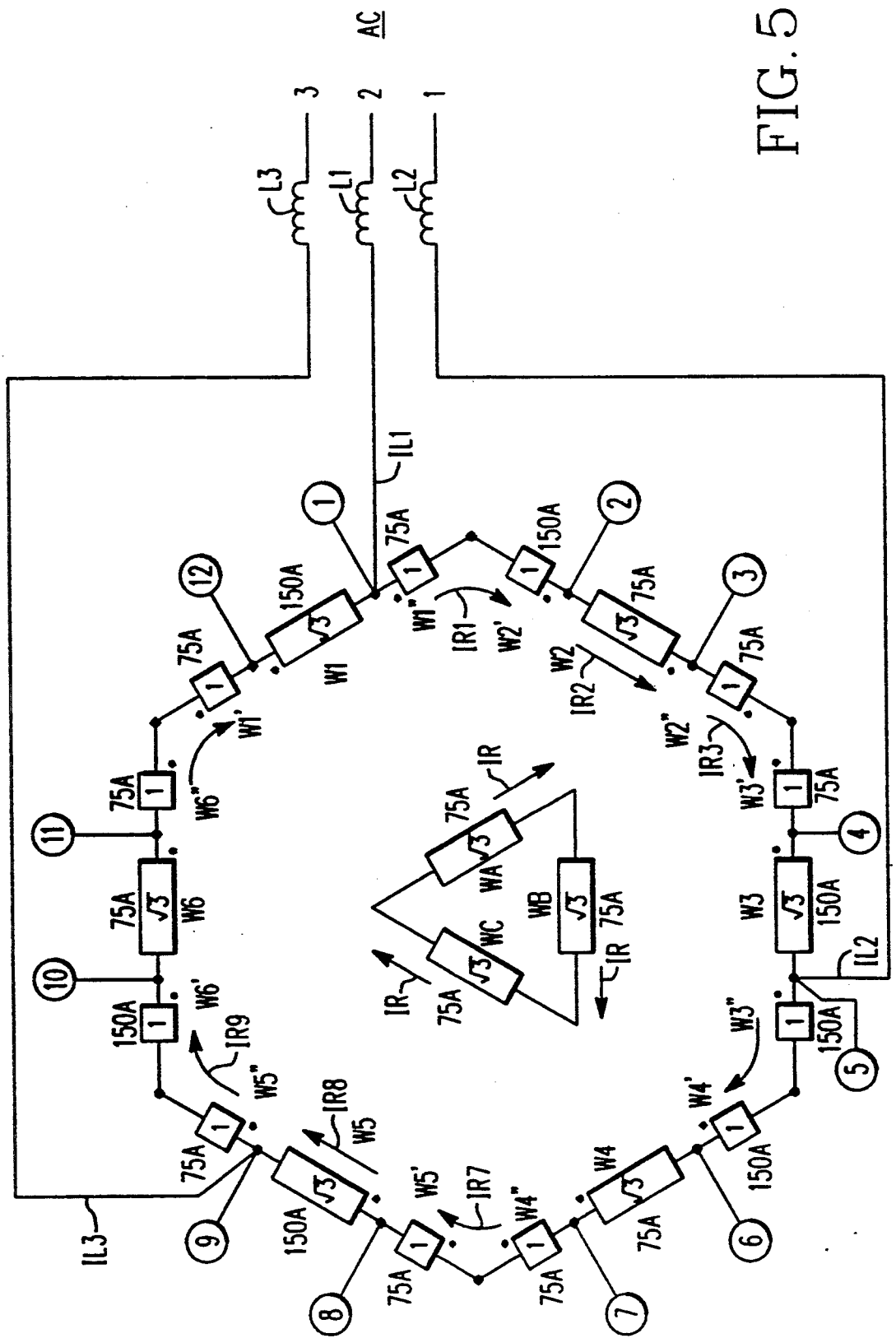
FIG. 5 illustrates a 12-pulse auto-connected hexagon converter having, according to the preferred embodiment of the invention, a tertiary winding in the center of the hexagon.
Figure 8A:
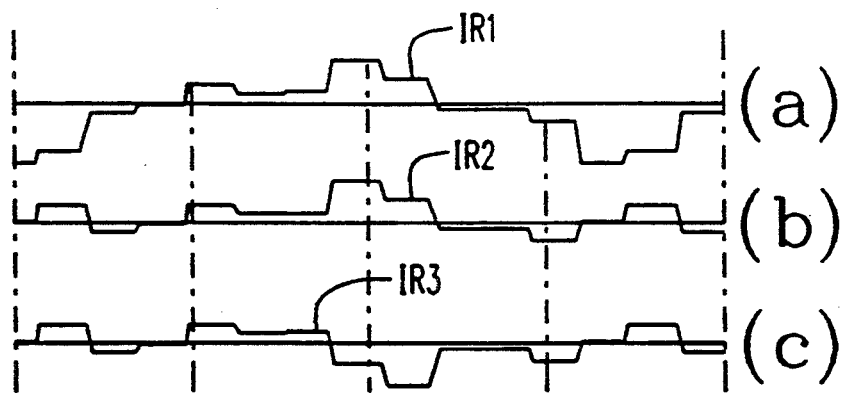
FIGS. 8A, 8B and 8C show current waveforms in relation to the embodiment illustrated by FIGS. 5 and 6.
Figure 8B:
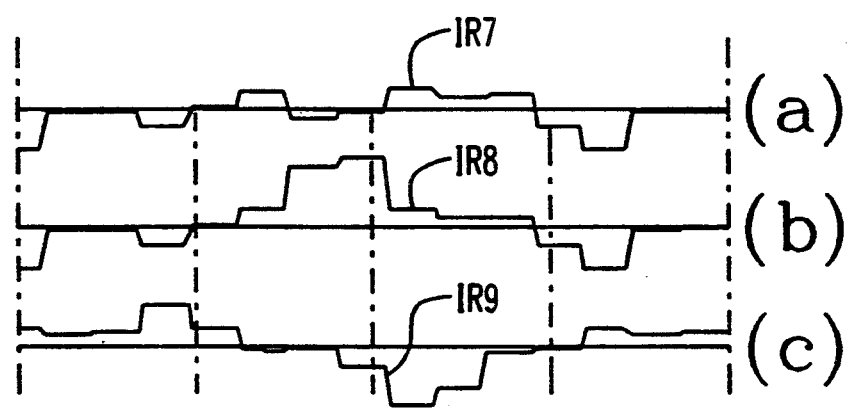
Figure 8C:
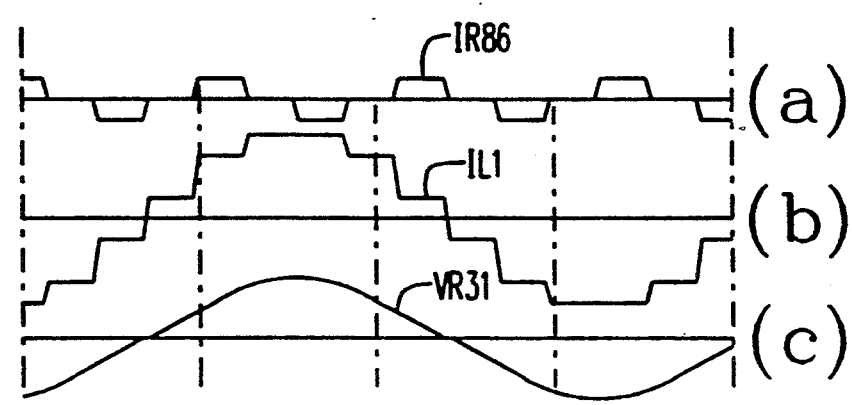
Figure 9:
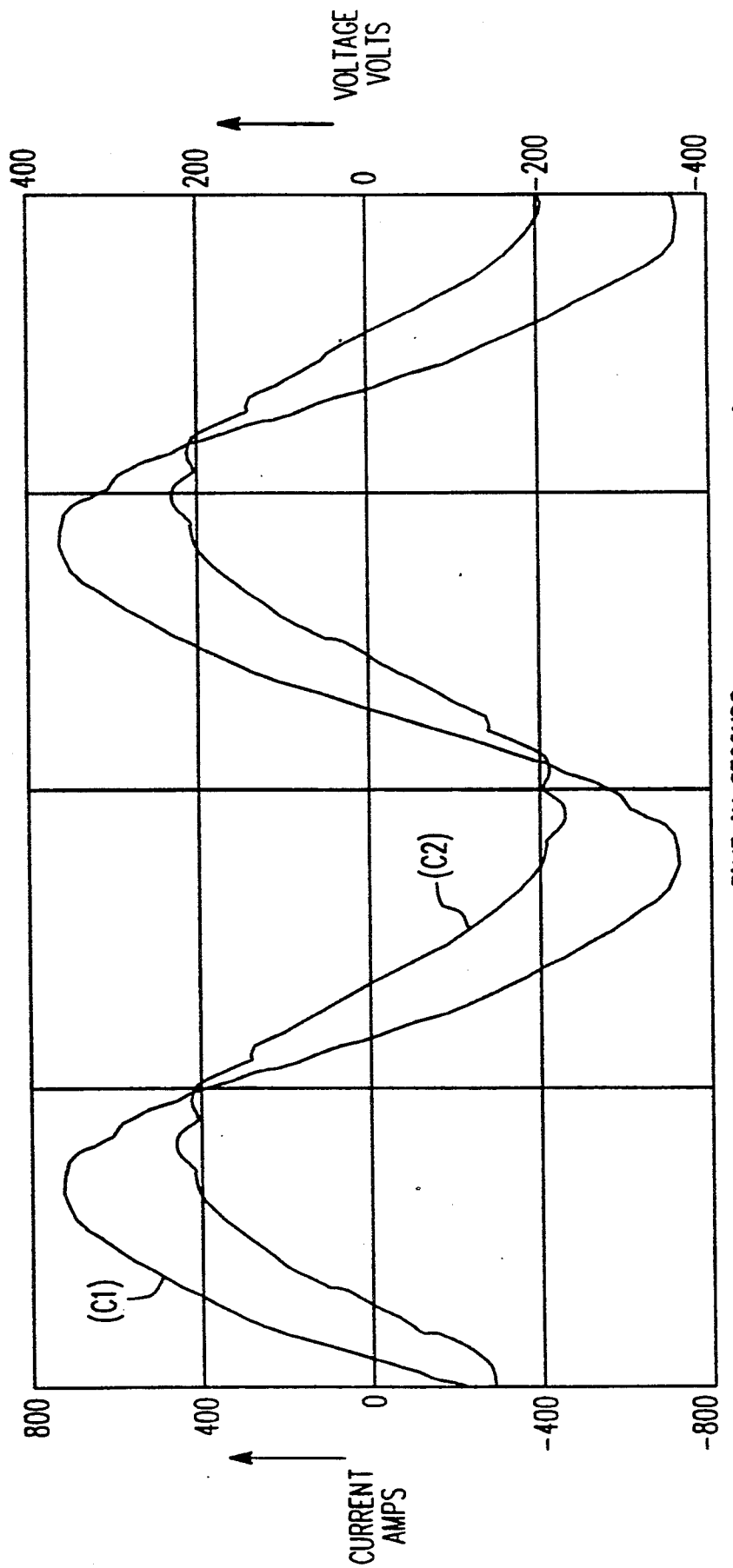
FIG. 9 illustrates the line-to-neutral voltage and the line current with the auto-connected converter of FIG. 5 when using 7.45% AC inductances and a source impedance of 3.6%.
Figure 10A:
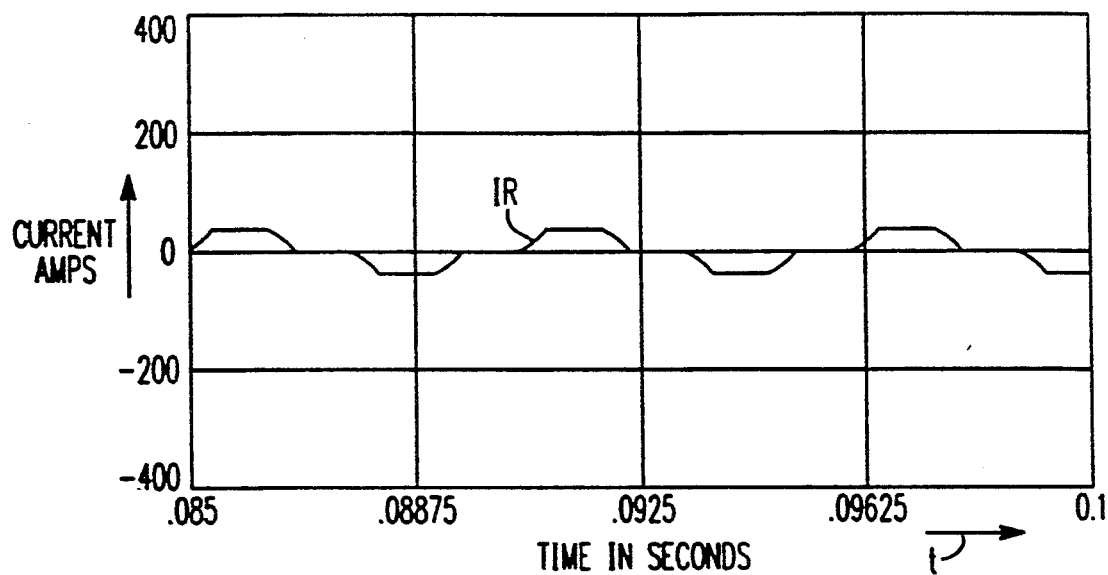
FIG. 10 shows the hexagon of FIG. 5 with a winding arrangement according to another embodiment of the invention.
Figure 10B:
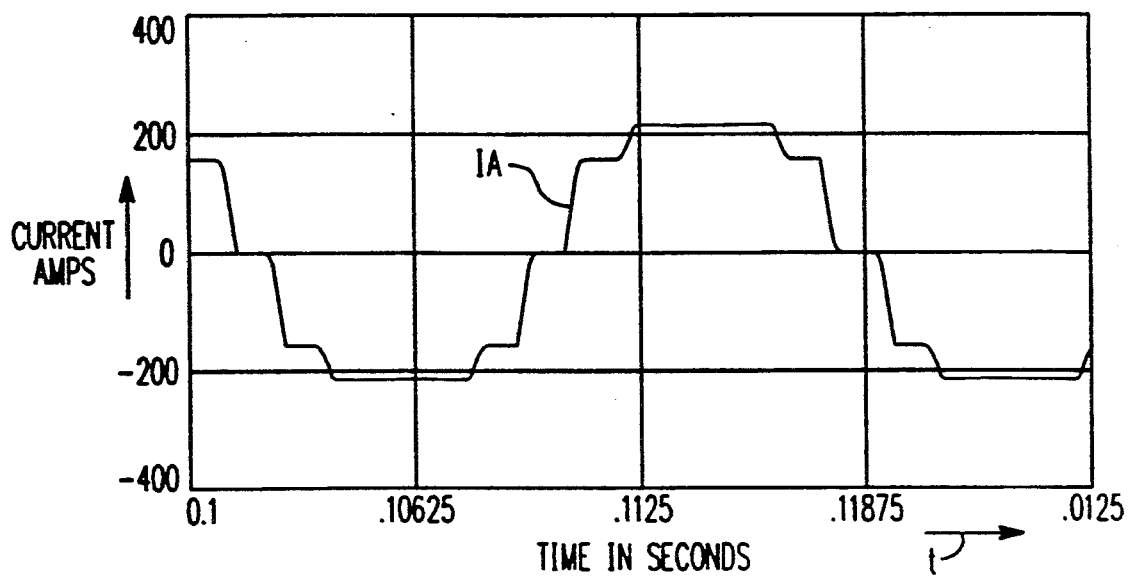

Referring to FIG. 4, a 12-pulse converter is shown (taken from U.S. Pat. No. 4,255,784) which is characterized by a true hexagon comprising six identical windings regularly distributed on the side of an hexagon for the secondary and a delta winding (ABC) for the primary (AC lines X, Y, Z). The rectifier lines are derived from twelve tappings taken symmetrically by pairs on each winding, one (T1, T2, T3, . . . ) for the positive side, the other (T1', T2', T3', . . . ) for the negative side. The U.S. Pat. No. 4,255,784 is hereby incorporated by reference. Referring to FIG. 5, by comparison with FIG. 4, the auto-connected hexagon converter according to the present invention is shown to differ therefrom in that the three AC lines (X,Y,Z) are directly connected to points A, B, C, respectively, which are at 120 degree phase shift on the regular hexagon. The hexagon is similar to the hexagon of FIG. 4. For the sake of clarity, each side of the hexagon is shown having one central winding and two lateral windings symmetrically disposed (W1 and W1', W1"; W2 and W2',W2"; . . . ) thereby accounting for the tappings (T1 and T1'; T2, and T2"; . . . in FIG. 4) of lines 1, 2, . . . shown in FIG.

5. Also, for the purpose of simplification, the rectifiers (R1, R1'; R2, R2'; in FIG. 4) have not been shown in FIG. 5, but they are provided as well known in the prior art regarding static AC-to-DC or DC-to-AC converters. In contrast to the setting of the hexagon of FIG. 4, the hexagon of FIG. 5 is auto-connected. This means that there is no separate primary winding for magnetically coupling currents derived from the AC lines with currents flowing in the secondary windings proper forming the hexagon. AC lines X, Y, Z of FIG. 4 are in FIG. 5 directly applied to the hexagon, although at 120 degree phase shift, and they are connected through inductors L1, L2 and L3. Current IL1 from line Z goes to nodal point A between windings W1 and W1" for the first line, whereas current IL2 of line Y goes to nodal point B between W3 and W3". Similarly, for line X the AC line nodal point will be between W5 and W5". The same could be obtained by choosing the opposite series of nodal points : between W1' and W1, W3'and W3, W5' and W5. Another possibility of auto-connecting lines X, Y, Z to the hexagon would be to use three apeces of even number (or of uneven number) successively.

According to the present invention, in addition to such an auto-connected hexagon transformer, a delta winding such as would be used for the primary winding in 10 FIG. 4 is now placed in the center of the hexagon (delta-connected windings WA, WB and WC) as a dead winding. By combining auto-connection and adding such tertiary winding, a 12-pulse converter system is obtained having clearly superior characteristics. First, the transformer rating has by about 42%. Moreover, the input current distortion will be reduced to less than 3% as explained hereinafter. It is observed, thus, that by auto-connection the AC output open circuit voltage is 11.53% higher than the AC input voltage. This increase in voltage is highly desirable and it leads to an open circuit DC voltage which is 1.56% times the AC line input voltage. A most favorable consequence of this is to make it possible to insert AC line reactances (L1, L2 and L3 on FIG. 5) which will have the effect of reducing quite significantly the harmonic currents on lines X, Y, Z. At the same time, this will allow a full DC output voltage to be generated, in relation to the available AC line input voltage. In this regard, the choice of 120 degree inputs at A, B, C, shown in FIG. 5, while very easily applied, will also raise the effective voltage. Moreover, since three of the diodes, or SCR's, (placed at junction points 1, 5 and 9) become directly connected to the source and the transformer rating is lower than if lines X, Y, Z were connected to the apeces.

Returning to the presence of a tertiary winding at the center of the hexagon, the circulating currents in windings WA, WB and WC allow a free flow of the third and even the triple harmonic currents, a serious improvement which is coming on top of the other advantages mentioned earlier.

What is claimed is:

1. In a 12-pulse static converter for converting three-phase alternating current (AC) power into direct current (DC) across a positive and a negative DC output terminal, with a polygonal succession of windings forming a regular hexagon with hexagon windings and with 12 rectifying devices equally distributed about 12 successive tappings from said windings and at 30 degrees to one another; the combination of:

three AC input terminals connected to said hexagon windings at 120 degrees to one another; and a set of three windings symmetrically and centrally disposed within said hexagon windings and coupled thereto in a delta mode;

each of said hexagon windings including a central winding means disposed between two equally placed side windings of lesser ampere-turn ratio for cooperating with said three windings on said delta mode to reduce harmonic current in said direct current.

2. The converter of claim 1 with said delta windings each having said lesser ampere-turn ratio.

3. The converter of claim 2 with each one of said delta windings being mainly coupled with two opposite hexagon windings.

4. The converter of claim 3 with said 12 tappings being at a nodal point between a central winding and a side winding.

5. The converter of claim 4 with an inductor in series with each of said rectifier devices.

6. The converter of claim 4 with each one of said inductors being common to two rectifier devices placed at 120 degrees relative to of said rectifier devices about said hexagon.

* * * * *